United States Patent [19]

Stewart, Jr.

[11] 4,173,662

[45] Nov. 6, 1979

[54] PROCESS FOR FORMING A FUEL CELL MATRIX

[75] Inventor: Robert C. Stewart, Jr., Granby, Conn.

[73] Assignee: United Technologies Corporation, Hartford, Conn.

[21] Appl. No.: 863,815

[22] Filed: Dec. 23, 1977

[51] Int. Cl.² .................. H01M 2/14; B05D 1/30
[52] U.S. Cl. ..................... 427/115; 427/372 A; 427/420; 429/41
[58] Field of Search ............ 427/115, 420, 372 A; 429/41

[56] References Cited

U.S. PATENT DOCUMENTS

| | | | |
|---|---|---|---|
| 3,407,249 | 10/1968 | Landi | 204/296 |
| 3,627,859 | 12/1971 | Mesite | 428/322 |
| 3,694,310 | 9/1972 | Emanuelson | 204/296 |
| 4,000,006 | 12/1976 | Trocciola | 427/115 |
| 4,001,042 | 1/1977 | Trocciola | 427/115 |
| 4,008,121 | 2/1977 | Coleman | 427/420 |

*Primary Examiner*—Michael F. Esposito
*Attorney, Agent, or Firm*—Stephen E. Revis

[57] ABSTRACT

A process for forming a fuel cell electrolyte matrix on the surface of an electrode involves passing the electrode through a vertically falling curtain or waterfall of the matrix material carried in a liquid vehicle. The coated electrode is then heat treated to remove the liquid vehicle, leaving a layer of matrix material on the electrode surface. This curtain coating process has been used to produce matrix layers of 2.5 mils having a variation in thickness of no more than 0.2 mils.

9 Claims, No Drawings

PROCESS FOR FORMING A FUEL CELL MATRIX

BACKGROUND OF THE INVENTION

1. Field of the Invention

This invention relates to fuel cells and more particularly to electrolyte retaining matrices and methods for making the same.

2. Description of the Prior Art

Fuel cells for the production of electrical energy from a fuel and oxidant are well known in the art. Such cells in their most simplified design, comprise a housing, an oxidizing electrode spaced apart from a fuel electrode, and an electrolyte disposed between and in contact with said electrodes. The electrolyte can be a solid, a molten paste, a free-flowing liquid, or a liquid trapped in a matrix. This application is concerned with the latter type of matrix which is preferred for many applications.

For optimum performance in a fuel cell employing a trapped aqueous electrolyte, the matrix must exhibit certain properties. For example, the matrix must be hydrophilic. Also, it must be continuous to prevent gas crossover or mixing of reactant gases in the fuel cell; in other words, it should be entirely free from pin holes and cracks. It should be as thin as possible in order that the internal resistance losses through the electrolyte will be minimal. Intimate contact between the matrix and electrode surface is necessary to maximize catalyst utilization. Uniform thickness is also critical to good performance in that lack of uniformity can cause current maldistributions with a loss in performance. It is also desirable that the pore size distribution of the matrix be very well controlled so as to prevent gas crossover and to insure proper electrolyte distribution throughout the cell.

Compounding the problems of achieving the foregoing properties is the fact that one is limited in the choice of materials which can be used. For example, the materials must be chemically and thermally stable at cell operating temperatures; also, they must not poison the catalyst and they must have high electronic resistance. Finally, the matrix should be made by an economical process.

A common prior art economical method for making matrices has been by paper making techniques, wherein the matrix is formed into a sheet and sandwiched between the electrodes in a fuel cell or fuel cell stack by mechanical means. For example, Landi U.S. Pat. No. 3,407,249 forms sheets of fibrillated polytetrafluoroethylene. Mesite et al U.S. Pat. No. 3,627,859 forms a matrix sheet from cellulosic fibers in combination with a fluorocarbon polymer. Emanuelson et al U.S. Pat. No. 3,694,310 forms mats of matrix material from phenolic resin fibers coated with a phenolic beater addition resin.

Regardless of the material from which the mat is made, the mechanical sandwiching of a sheet type matrix between electrodes is deficient in that it does not necessarily result in intimate contact between the matrix and the electrode over the entire surface of the matrix. A further problem with making matrices by paper making techniques is that the desired thinness cannot be achieved without losing the property which prevents gas crossover. Even if the matrix sheet could be made as thin as desirable, it would be extremely difficult, if not impossible, to handle.

Another method for forming a matrix, which overcomes some of the problems with the paper making techniques, is to form the matrix directly on the surface of the electrode such as by dipping the electrode into an aqueous solution of the matrix material as described in Blanc et al U.S. Pat. No 3,022,244. This has also been accomplished by spraying or painting the matrix onto the surface of the electrode. While these techniques overcome some of the handling problems associated with separate matrix sheets, it is difficult to maintain a uniform thickness. Because of the nonuniformity of the thickness it may be necessary that some areas be thicker than desirable in order to assure that there are no bare spots in the thinnest areas.

Commonly owned U.S. Pat. Nos. 4,000,006 and 4,001,042 teach the use of screen printing for applying an electrolyte matrix to the surface of an electrode. Although screen printing overcomes virtually all of the problems discussed above with regard to other methods for making matrices, the speed of the process would probably be limited to the equivalent of about 100 feet of electrode length per minute for a fully automated operation. This is quite fast compared to other prior art methods, but it would be very desirable to be able to produce matrices at a considerably faster rate of speed. Also, despite their improvement over the prior art, it has been observed that matrices applied by the screen printing process show a pattern of "hills and valleys" which result from the imprint of the screen on the surface of the layer. If a similar quality matrix layer could be applied by a method which did not produce these "hills and valleys" (i.e., an even more uniform matrix layer) further advantages would be realized.

A well-known technique for applying thin layers of adhesives, lacquers or waxes on wood or composite material panels is "curtain coating". Chocolate and other coatings or candy and baked goods are also applied by the method of curtain coating. The curtain coating technique is simple in principle. Basically, a continuous, vertical curtain of the coating material is created by having the material flow through a narrow slot. A conveyor system carries the material to be coated through the curtain. The coating thickness is controlled, for the most part, by the conveyor speed, the slot width, the viscosity of the coating fluid, and the magnitude of the pressure which forces the fluid through the slot. Conveyor speeds of 500 feet per minute and higher are possible for the foregoing applications. All of the coating material which is not applied to the substrate being coated flows to a return trough and is reused by pumping it back to the slot. Additional details concerning curtain coating equipment for these prior art applications is found in a paper presented at the 1966 Annual Fall Seminar of the Adhesive and Sealant Council titled "The Use of Curtain Coating Equipment in the Application of Adhesives" by Dr. Charles E. Wetzler, said paper being incorporated herein by reference.

Despite the extensive use of curtain coating for the application of finishes and adhesives to a variety of substrates, there is no teaching or suggestion that a fuel cell matrix with all its attendant high technology properties and characteristics can be satisfactorily formed by the curtain coating process.

SUMMARY OF THE INVENTION

One object of the present invention is an economical method for forming a fuel cell electrolyte matrix.

A more particular object of the present invention is a high speed method for applying a fuel cell electrolyte matrix to the surface of an electrode, the matrix being uniform and thin, and having all the characteristics and properties necessary for good performance in a fuel cell.

Accordingly, the present invention is a process for forming a fuel cell electrolyte matrix on the surface of an electrode by passing the electrode through a continuous curtain of matrix material carried in a liquid vehicle, and heat treating the coated electrode to remove the liquid vehicle thereby leaving a layer of matrix material on the electrode surface.

More particularly, the curtain material comprises a smooth blend of particulate matrix material in a liquid vehicle. A trough (hereinafter referred to as a "head") filled with the curtain coating material feeds a slot of narrow and precise width. The fluid flows at a constant rate through the slot forming a continuous vertically moving curtain of the coating material. The electrode is passed through this curtain of flowing material at a constant rate of speed and is thereby coated on its upward facing surface by the curtain material. The liquids are removed by heating the coated electrode. We have produced matrices by the process of the present invention five times faster than our estimated fastest possible speed using screen printing; and even faster speeds can be expected for fully automated production size runs.

As with curtain coating practiced in the prior art, the thickness of the applied layer depends upon the rate at which the fluid flows through the slot, and the speed at which the electrode passes through the curtain. The rate of fluid flow through the slot will, of course, depend upon the slot width, the viscosity of the fluid, and the pressure with which it is pushed through the slot. The pressure can simply be the head of fluid above the slot (i.e., gravity feed), or any desired pressure may be created over the surface of the fluid in the trough in order to increase or decrease the rate of fluid flow through the slot. In any event, it is important that all variables of the process be carefully controlled to maintain a substantially constant mass flow through the slot in order to obtain a uniformly thick coating on the electrode.

Because the matrix material of a fuel cell electrode is totally different from the coatings known to have been applied in the past by curtain coating, and because of the different and more stringent requirements of the fuel cell matrix as compared to, for example, adhesives, it could not initially be determined and it certainly was not obvious that the curtain coating process could be used. One concern was that the curtain materials of the prior art processes contained no or very low concentrations of solids (i.e., filler). Our curtain material preferably contains on the order of 50% solids, the balance being water and a thickener. It was thought that with a curtain material of this nature the coating might be lumpy, or the material might build up in the slot thereby changing the slot size and the thickness of the coating. It was also not known whether the material would foam up as it hit the surface of the substrate; air bubbles in the finished matrix could not be tolerated.

Another concern is related to maintaining a substantially constant viscosity of the curtain material. In the prior art, when applying adhesives the solvent (typically water or a petroleum based solvent) in the curtain material evaporates at a relatively rapid rate due to the large exposed surface area of the curtain. As the solvent evaporates the material gets thicker such that it flows through the slot at a reduced rate resulting in a coating which is too thin. Solvent is added as necessary to compensate for the solvent lost. Surprisingly, we had just the opposite problem. In our case, in addition to the water evaporating (which in and of itself would have caused the curtain material to thicken) our thickening agent was breaking down due to the shearing action of the system. The net effect was a reduction rather than an increase in the viscosity over a period of time resulting in a thicker layer being applied to the substrate.

The foregoing and other objects, features, and advantages of the present invention will become more apparent in the light of the following detailed description of preferred embodiments thereof.

DESCRIPTION OF THE PREFERRED EMBODIMENTS

EXAMPLE

The process of the present invention was practiced using a commercially available curtain coating machine Model 80 C manufactured by the Ashdee Division of George Koch Sons, Inc., Evansville, Indiana. In this machine the coating curtain width is 31.5 inches. The conveyor belt system for carrying the substrate through the curtain has a speed range of from 80 to 560 feet per minute and can handle substrates up to 29.5 inches wide. The slot through which the coating fluid flows is formed by two spaced apart, parallel, horizontal stainless steel blades disposed under a feed trough or "head" filled with the coating fluid. The slot width on this model can be adjusted to from 0.0 to 0.196 inch and can be positioned from three to ten inches above the conveyor belt.

As purchased, the above described curtain coating maching included a pressurized type of head so that a pressure could be maintained above the surface of the fluid in the head in order to control the flow rate through the slot. This feature of the machine was not used. Instead, the machine was modified by adding an overflow weir. The level of the fluid in the head is maintained constant by this overflow weir, thereby maintaining a constant pressure head of fluid above the slot.

The curtain coating machine includes a return trough disposed underneath the conveyor belt for catching any fluid which does not remain on the substrate, or in our case on the electrode. This fluid is recirculated by suitable pumps to the head. The machine, as purchased, included a Moyno progressing cavity pump suitable for the adhesives and other coating materials for which these machines have been used in the past. Our particular coating fluid clogged this pump due to the high content of solids in the fluid; additionally, excessive shear action within the pump reduced the viscosity of the curtain coating fluid. Therefore, the original equipment pump was replaced by a Model SA2-A diaphragm pump from Warren Rupp Company of Mansfield, Ohio. This diaphragm pump was able to handle the fluid with minimal shear damage.

Using the foregoing machine, 2.5 mil thick silicon carbide matrix layers were applied over the platinum catalyzed surface of gas diffusion electrodes. Silicon carbide is a known electrolyte retaining matrix material for fuel cells, and is described in detail in commonly owned U.S. Pat. No. 4,017,664 which is incorporated herein by reference. As discussed in that patent, a silicon carbide matrix preferably comprises at least 90% silicon carbide and up to 10% polytetrafluoroethylene (PTFE) as a binder.

The coating fluid (i.e., curtain material) was formulated by blending 7000 grams of a 2% aqueous solution of polyethylene oxide (as a thickener), 25,000 milliliters of water (as a solvent or liquid carrier), and 36,000 grams of powdered silicon carbide. These ingredients were blended until the mixture was uniform and had no lumps (typically about one-half hour). Added to this mixture was 2480 grams of a 60% (by weight) solution of polytetrafluoroethylene. The new mixture was blended for no more than five minutes. In this example the polyethylene oxide was Union Carbide's Polyox WSR-301 and the polytetrafluoroethylene solution was Dupont's TFE 3170. TFE 3170 comprises, by weight, 60% PTFE, 6% surfactant, and 34% water.

The foregoing recipe yields a curtain material comprising 53.2% solids, by weight. These solids consist of 96% silicon carbide and 4% polytetrafluoroethylene. Although the recipe was intended to produce a fluid having the preferred viscosity of between 350 and 500 centipoise, which is a very narrow range, fluids having a viscosity up to 700 centipoise were permitted to be used even though above specification limits.

To obtain the 2.5 mil matrix layer using the foregoing curtain material the slot width was set at 30 mils, an eight-inch head of fluid was maintained over the slot, and the conveyor belt speed or substrate speed through the curtain of fluid was maintained at 250 feet per minute. During the run the viscosity was periodically measured. Variations of greater than 25 centipoise from the nominal desired viscosity of about 400 centipoise was sometimes compensated for by changing the conveyor belt speed by up to 15 feet per minute. This was only a temporary measure since the viscosity would continue to drop with time. Eventually a replenisher fluid was added to the machine for the purpose of increasing the viscosity back to within specification limits. The replenisher fluid was made using essentially the same recipe as the original fluid except 1250 milliliters of water was replaced by an additional 1250 grams of 2% polyethylene oxide solution. (The polyethylene oxide solution has approximately the same density as water.)

After coating the electrode was heat treated to remove the water, polyethylene oxide, and surfactant and to sinter (i.e., partially melt) the polytetrafluoroethylene binder. A typical heat treatment was 50 seconds at 200° F. to remove the water and 55 seconds at 570° F. to sinter the PTFE and burn off the polyethylene oxide and surfactant. The finished matrix layer had a nominal thickness of 2.5 mils with a variation in thickness of no more than 0.2 mils. This variation of thickness, although perhaps surprisingly small, can be readily obtained by the process of the present invention and is a significant improvement over prior art methods.

Pairs of such electrodes were disposed in a fuel cell with matrices facing and in contact with each other yielding in nominal matrix thicknesses of 5.0 mils. The matrices performed well. If the matrix layer had been applied twice as thick, a similar fuel cell could have been made using one coated and one uncoated electrode. Preferably, a silicon carbide fuel cell matrix should have a total thickness of no greater than 10 mils.

Data pertaining to other matrices by the process of the present invention is presented in the table below. In all instances the curtain material contained about 53.7% solids in the form of about 95.4% silicon carbide and 4.6% PTFE. Note how different combinations of parameters can be used to produce the same matrix thickness. All of the matrices set forth in the table were tested in subscale fuel cells an performed satisfactorily.

The curtain coating trials depicted by the data in the table are representative of our testing of the process of the present invention. It was not attempted to run sufficient tests to determine experimentally the extremes of the parameters which may be used to produce satisfactory matrices. However, based upon our knowledge of the process of the present invention and the testing which we have done, it is estimated that, in general, the curtain material should comprise 15–60% solids, by weight, 45–55% being preferred. The viscosity of the curtain fluid should be somewhere between 50 and 1000 centipoise, and preferably between 175 and 700 centipoise. Most preferably the viscosity should be between 350 and 500 centipoise. The slot width should not be less than about 25 mils nor greater than about 80 mils. Preferably the slot width should be between 30 and 50 mils. With regard to the substrate or electrode speed through the curtain, speeds as fast as 560 feet per minute (the maximum speed of the machine) have been used. Certainly the process is capable of higher speeds. Speeds as slow as 80 feet per minute have also been used. Of course, higher speeds generally require lower viscosity fluids and/or larger slot widths. A limiting factor might be the speed at which the substrate lifts off the belt due to air currents.

In all the examples of the table the liquid vehicle was a combination of water (as the carrier or solvent) and polyethylene oxide (as the thickener); however, any carrier which can be evaporated and is compatible with the other materials in the fluid may be used. Examples of other possible carriers are glycol and glycerin. Other thickeners which may be used are algenates, natural gums, and polyacrylates. An example of a polyacrylate is Carbopol ® manufactured by the B.F. Goodrich Chemical Company, Cleveland, Ohio.

TABLE:

| OTHER CURTAIN COATING TRIALS | | | | | |
|---|---|---|---|---|---|
| Matrix Thickness (mils) | Fluid Viscosity (centipoise) | Solids in Fluid (%) | Slot Widths (mils) | Head (inches) | Belt Speed (ft/min) |
| 2.0 | 200–250 | 53.7 | 50 | 4.0 | 525 |
| 2.1 | 175–225 | " | 50 | 3.0 | 525 |
| 2.2 | 325–375 | " | 45 | 7.0 | 525 |
| 2.2 | 375–425 | " | 30 | 7.5 | 270 |
| 2.5 | 255–305 | " | 50 | 5.5 | 525 |
| 2.5 | 385–435 | " | 30 | 7.5 | 240 |
| 3.0 | 215–265 | " | 50 | 4.5 | 350 |
| 3.0 | 325–375 | " | 45 | 7.5 | 350 |
| 3.0 | 385–435 | " | 30 | 7.5 | 216 |
| 3.4 | 255–305 | " | 50 | 5.0 | 350 |
| 3.7 | 475–525 | " | 45 | 7.5 | 180 |
| 4.0 | 325–375 | " | 45 | 7.5 | 263 |
| 4.2 | 265–315 | " | 50 | 5.0 | 263 |
| 4.2 | 255–305 | " | 50 | 5.5 | 350 |
| 4.4 | 245–295 | " | 50 | 5.0 | 263 |
| 4.5 | 465–515 | " | 45 | 7.5 | 150 |
| 5.4 | 455–505 | " | 45 | 7.5 | 135 |

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A process for making a fuel cell electrode/matrix element comprising the steps of:

creating a continuous falling curtain of material having a viscosity of between 50 and 1000 centipoise and comprising between 15% and 60%, by weight, fuel cell electrolyte matrix material carried in a balance of liquid vehicle by flowing said curtain material through a slot of constant width between 25 and 80 mils, the rate of mass flow of the curtain being maintained substantially constant;

passing a fuel cell electrode through said curtain at a constant speed to coat a surface of said electrode with said curtain material; and heat treating the coated electrode to remove the liquid vehicle leaving a layer of matrix material on the electrode surface.

2. The process according to claim 1 wherein said curtain material comprises 45% to 55% matrix material, by weight, and has a viscosity between 175 and 700 centipoise.

3. The process according to claim 2 wherein said matrix material comprises at least 90% silicon carbide, by weight, and up to 10% binder.

4. The process according to claim 3 wherein said curtain material has a viscosity between 350 and 500 centipoise.

5. The process according to claim 2 wherein said slot width is between 30 and 50 mils.

6. The process according to claim 5 wherein said matrix material comprises at least 90% silicon carbide and a balance of polytetrafluoroethylene.

7. The process according to claim 6 wherein said liquid vehicle comprises water as a liquid carrier and polyethylene oxide as a thickener.

8. The process according to claim 1 wherein said layer of matrix material left on the surface of the electrode is between 2.0 and 10.0 mils thick.

9. The process according to claim 8 wherein said layer of matrix material varies in thickness by no more than 0.2 mil and includes at least 90% by weight silicon carbide and up to 10% binder.

* * * * *